(12) United States Patent
Chu et al.

(10) Patent No.: US 11,367,300 B2
(45) Date of Patent: Jun. 21, 2022

(54) METHOD FOR ENABLING ELECTRONIC DEVICE TO RECEIVE FINGERPRINT DATA AND ELECTRONIC DEVICE THEREOF

(71) Applicant: InnoLux Corporation, Miao-Li County (TW)

(72) Inventors: I-Chieh Chu, Miao-Li County (TW); Chuan-Chi Chien, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 137 days.

(21) Appl. No.: 16/779,672

(22) Filed: Feb. 3, 2020

(65) Prior Publication Data

US 2020/0265207 A1   Aug. 20, 2020

(30) Foreign Application Priority Data

Feb. 19, 2019   (CN) .......................... 201910124662.2

(51) Int. Cl.
*G02F 1/133*    (2006.01)
*G06V 40/13*    (2022.01)
*G02F 1/1335*   (2006.01)
*G02F 1/1368*   (2006.01)
*H01L 27/146*   (2006.01)

(52) U.S. Cl.
CPC ........ *G06V 40/1318* (2022.01); *G02F 1/1368* (2013.01); *G02F 1/13318* (2013.01); *G02F 1/133512* (2013.01); *G02F 1/133514* (2013.01); *H01L 27/14612* (2013.01)

(58) Field of Classification Search
CPC .................................................. G02F 1/13318
See application file for complete search history.

(56) References Cited

U.S. PATENT DOCUMENTS

2017/0243912 A1\* 8/2017 Kaneda ............. H01L 27/14647
2019/0114458 A1\* 4/2019 Cho .................... G06K 9/2027

FOREIGN PATENT DOCUMENTS

CN          109037474 A   \* 12/2018

\* cited by examiner

*Primary Examiner* — Edmond C Lau
(74) *Attorney, Agent, or Firm* — Winston Hsu

(57) ABSTRACT

A method for enabling an electronic device to receive a fingerprint data and an electronic device are disclosed. The electronic device includes a display unit and a sensing unit, and the display unit includes a green sub-pixel, a blue sub-pixel and a red sub-pixel. The method includes the following steps: the green sub-pixel of the display unit being in an on state, the blue sub-pixel and the red sub-pixel of the display unit being in off state; producing a visible light by the display unit; using the sensing unit to sense a reflected portion of the visible light; and receiving the fingerprint data from the sensing unit.

13 Claims, 11 Drawing Sheets

METHOD FOR ENABLING ELECTRONIC DEVICE TO RECEIVE FINGERPRINT DATA AND ELECTRONIC DEVICE THEREOF

BACKGROUND OF THE DISCLOSURE

1. Field of the Disclosure

The present disclosure relates to a method for enabling an electronic device to receive a fingerprint data and an electronic device thereof, and more particularly to a method for receiving a fingerprint data by using an optical sensing element and an electronic device thereof.

2. Description of the Prior Art

Generally, fingerprint recognition can be applied in identity identification, and therefore, with the development of electronic devices, the function of fingerprint recognition is also integrated in various electronic devices and widely used. Taking a display device such as a smart phone as an example, the user can manage the electronic device directly through the fingerprint recognition without memorizing the password. In addition, since the process of the fingerprint recognition is fast and difficult to be imitated, the fingerprint recognition can provide good convenience or safety. However, in the current display panel combined with the fingerprint sensing function, since the recognition component may often receive the light produced from different pixels, that is, the recognition component is easily interfered by stray light, as a result, the fingerprint recognition effect is poor. Therefore, the industry still has to continue to study the method of enhancing the accuracy of the fingerprint recognition.

SUMMARY OF THE DISCLOSURE

The present disclosure provides an electronic device having a fingerprint recognition function and a method of reducing the interference of stray light in an electronic device when the electronic device receives a fingerprint data. When the fingerprint recognition is performed, the display unit in the electronic device provides visible light of higher energy with a specific wavelength range.

According to an embodiment, the present disclosure provides a method for enabling an electronic device to receive a fingerprint data. The electronic device includes a display unit and a sensing unit. The display unit includes a green sub-pixel, a blue sub-pixel and a red sub-pixel. The method of the present disclosure includes: producing a visible light by the display unit; using the sensing unit to sense a reflected portion of the visible light; and receiving the fingerprint data from the sensing unit.

According to an embodiment, the present disclosure provides an electronic device including a display unit and a plurality of photoelectric converting elements. The display unit includes a plurality of first conducting wires and a plurality of second conducting wires respectively extending along different directions. The plurality of first conducting wires are intersected with the plurality of second conducting wires to define a plurality of sub-pixels. The plurality of photoelectric converting elements are respectively disposed in one sub-pixel of the plurality of sub-pixels, and a ratio of a total number of the plurality of photoelectric converting elements to a total number of the plurality of sub-pixels is in a range from 1/3 to 2/3, inclusive.

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. It is noted that, for purposes of illustrative clarity and being easily understood by the readers, various drawings of this disclosure may be simplified schematic diagrams, and the elements therein may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. When the terms "include", "comprise" and/or "have" are used in the description of the present disclosure, the corresponding features, areas, steps, operations and/or components would be pointed to existence, but not limited to the existence of one or a plurality of the corresponding or other features, areas, steps, operations and/or components. When the corresponding component such as layer or area is referred to "on another component (or the variant thereof)" or "extend to another component", it may be directly on another component or directly extend to another component, or other component may exist between them. On the other hand, when the component is referred to "directly on another component (or the variant thereof)" or "directly extend to another component", any component does not exist between them. In addition, when the component is referred to "be coupled to/with another component (or the variant thereof)", it may be directly connected to another component, or may be indirectly connected (such as electrically connected) to another component through other component or components.

It should be noted that the technical features in different embodiments described in the following can be replaced, recombined, or mixed with one another to constitute another embodiment without departing from the spirit of the present disclosure.

Figure 1:
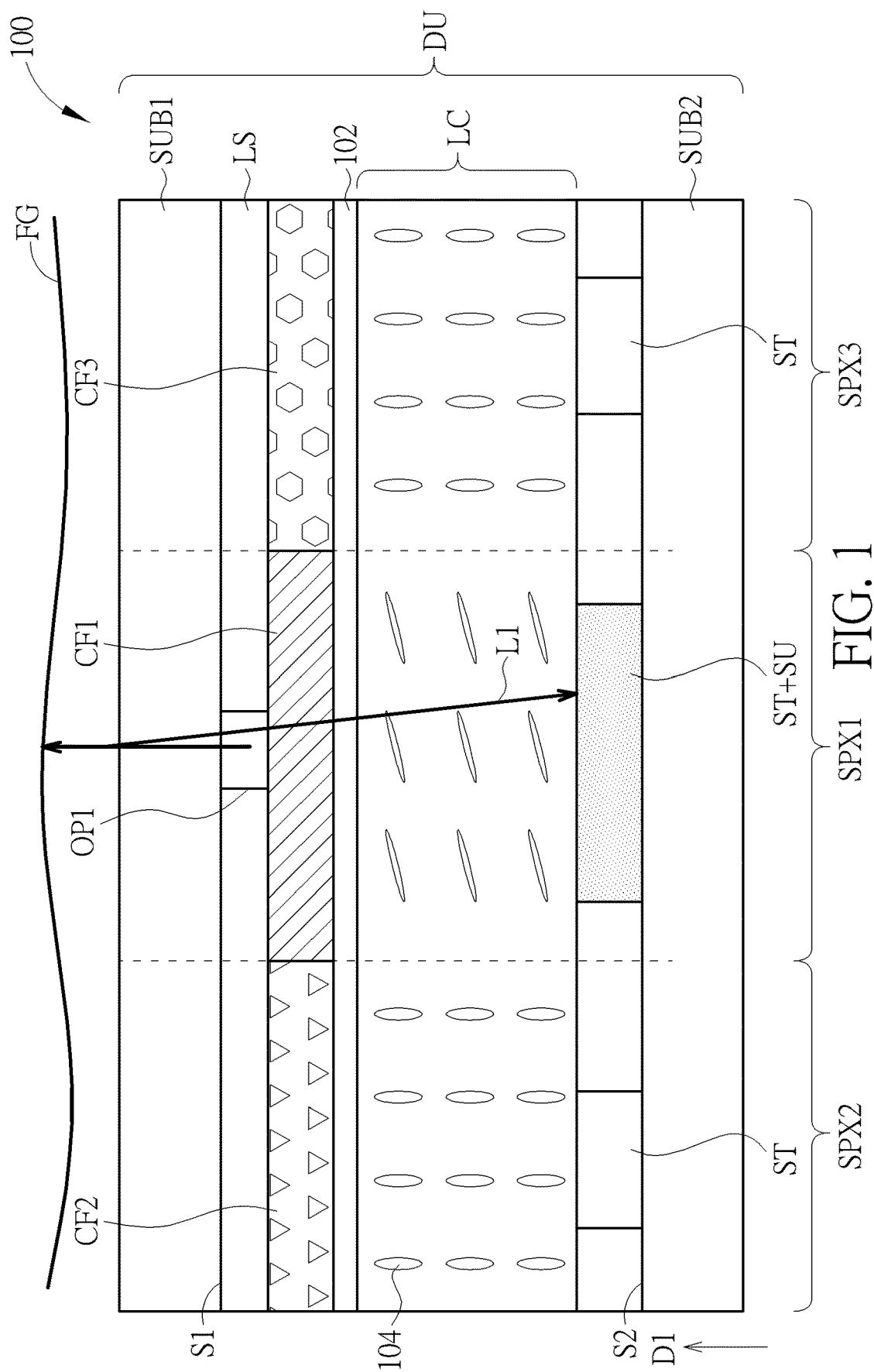
FIG. 1 is a schematic diagram of elements configuration according to a first embodiment of an electronic device of the present disclosure.
Figure 2:
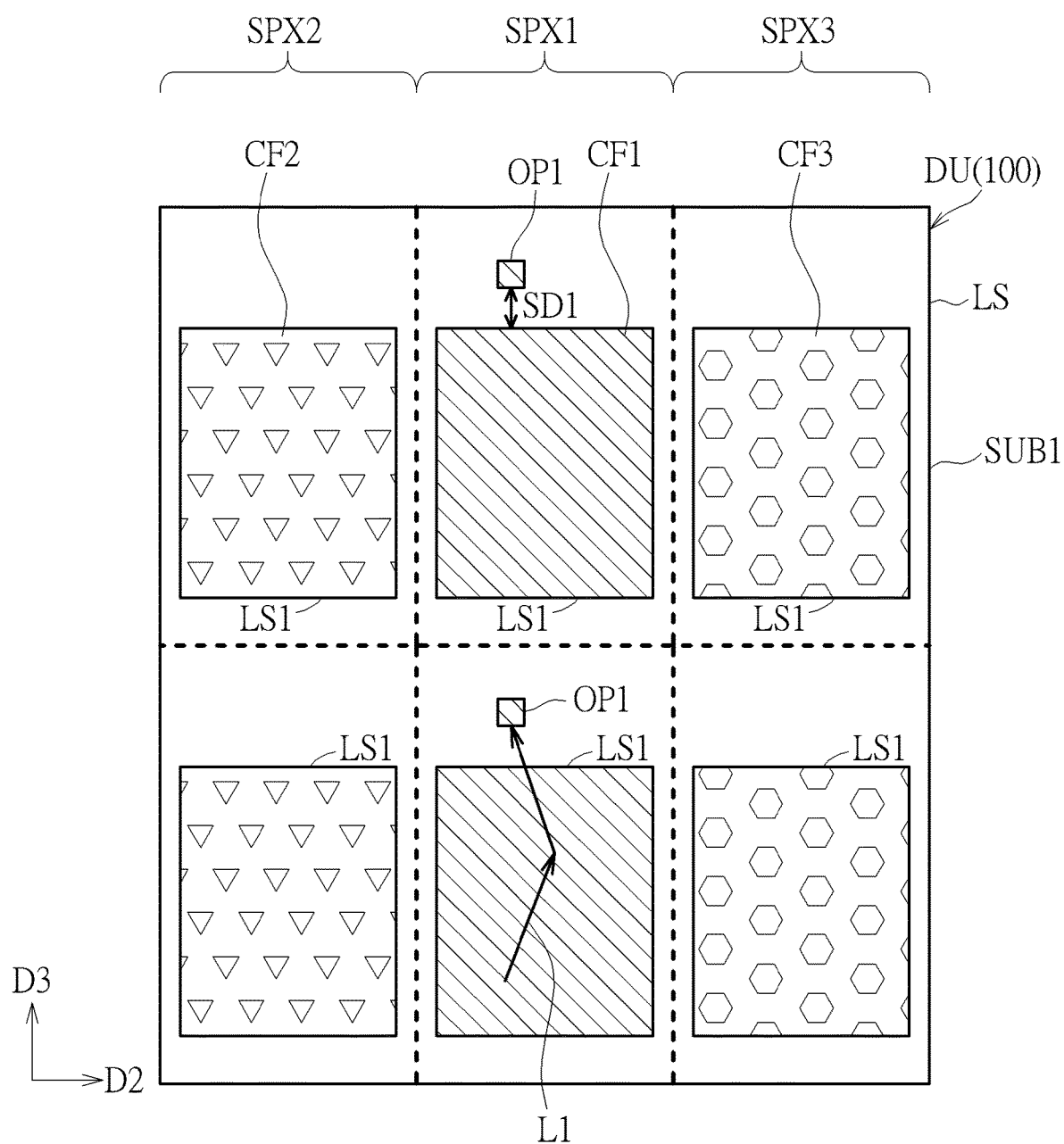
FIG. 2 is a top view schematic diagram of the light shielding layer and the color filter layer of the electronic device shown in FIG. 1.
Figure 3:
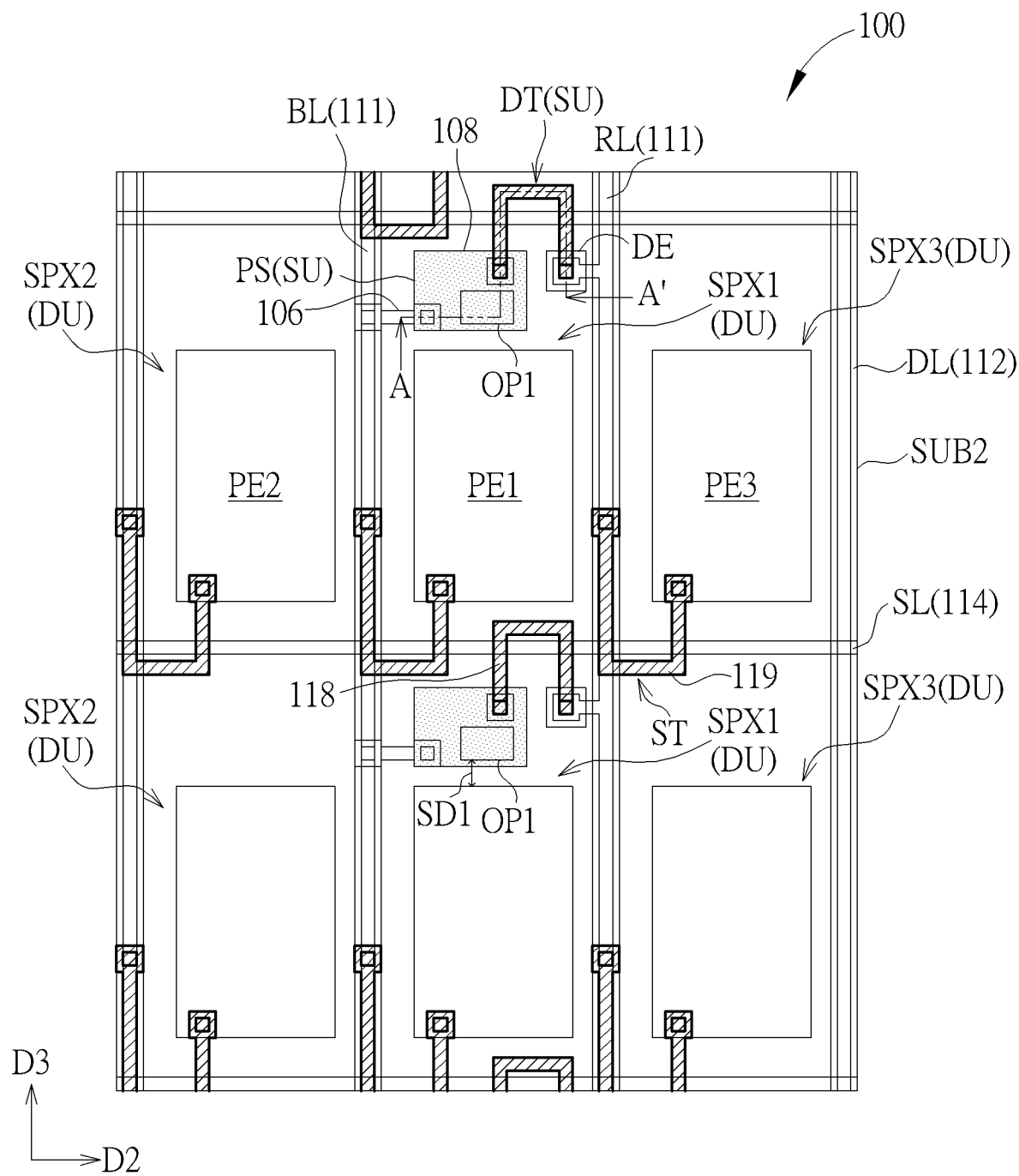
FIG. 3 is a detailed top view schematic diagram of the partial elements of the electronic device shown in FIG. 1.
Figure 4:
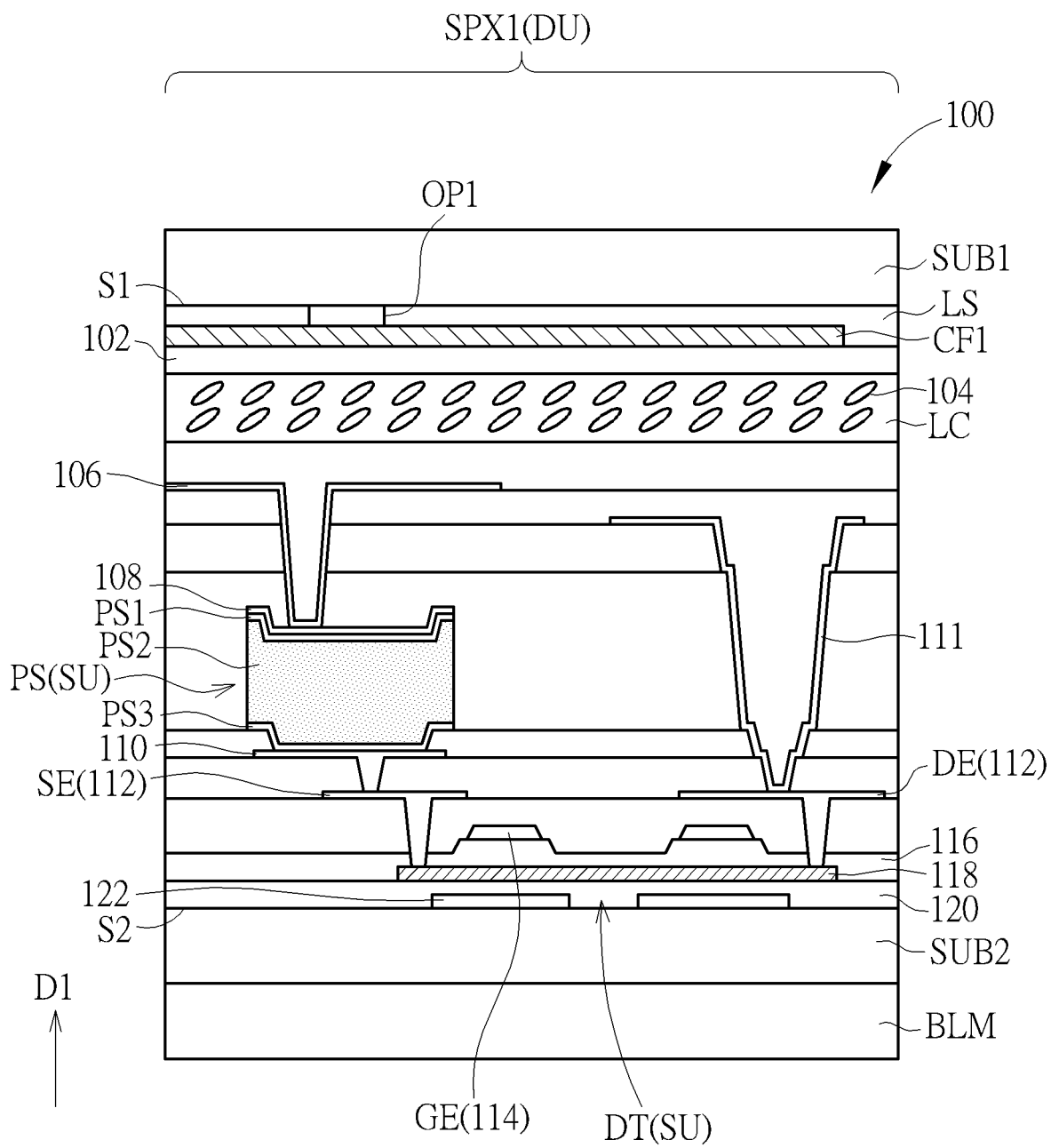
FIG. 4 is a cross-sectional view schematic diagram of structure along the section line A-A' of FIG. 3.
Figure 12:
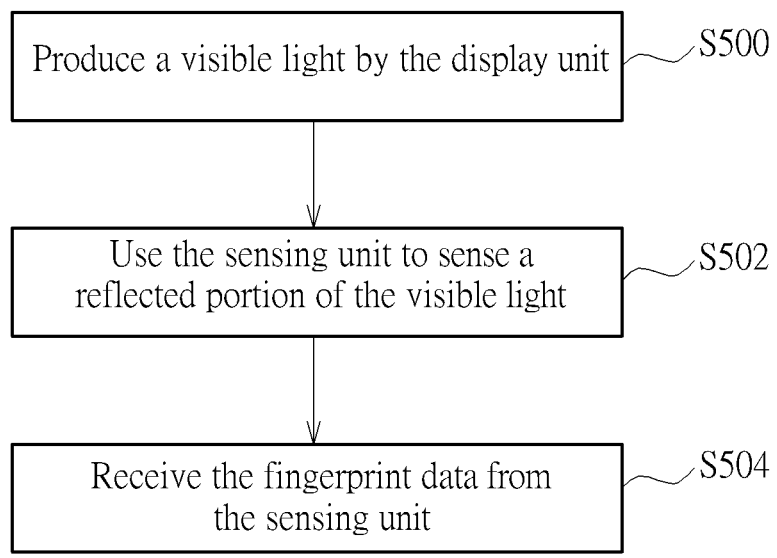
FIG. 12 is a flowchart according to the method for enabling an electronic device to receive a fingerprint data of the present disclosure.

The present disclosure introduces an electronic device and a method for enabling the electronic device to receive a fingerprint data. Please refer to FIG. 1 to FIG. 4 and FIG. 12 for the description of the first embodiment of the present disclosure. FIG. 1 is a schematic diagram showing configuration of elements according to a first embodiment of an electronic device of the present disclosure, and FIG. 1 is not a cross-sectional view diagram, wherein only partial elements are emphasized while other elements are omitted. FIG. 2 is a top view schematic diagram of the light shielding layer and the color filter layer (color layer) of the electronic device shown in FIG. 1, and the contours of the color filter layer and the light shielding layer are drawn in FIG. 2 while other elements are omitted. FIG. 3 is a detailed top view schematic diagram of the partial elements of the electronic device shown in FIG. 1, and the color filter layer and the light shielding layer are omitted in FIG. 3. FIG. 4 is a cross-sectional view schematic diagram of structure along the section line A-A' of FIG. 3. FIG. 12 is a flowchart according to the method for enabling an electronic device to receive a fingerprint data according to the present disclosure. First, please refer to FIG. 1 to FIG. 3. The electronic device 100 of the present disclosure is an electronic device including the fingerprint recognition function and the display function. The electronic device 100 includes a display unit DU and at least one sensing unit SU. The display unit DU is any device producing light, such as a device producing color light to display images or pictures. For example, the display unit DU can be a display such as a liquid-crystal display, an organic light-emitting display, a light-emitting diode display, a quantum dot material display or other suitable displays. This embodiment is taking that the display unit DU is a liquid-crystal display as an example, but not limited thereto. The display unit DU can include a plurality of sub-pixels, and for example, include a first sub-pixel SPX1, a second sub-pixel SPX2 and a third sub-pixel SPX3, and the first sub-pixel SPX1, the second sub-pixel SPX2 and the third sub-pixel SPX3 are disposed side by side respectively. The first sub-pixel SPX1, the second sub-pixel SPX2 and the third sub-pixel SPX3 can represent sub-pixels that can produce different color lights, and can be, for example, the green sub-pixel, the red sub-pixel and the blue sub-pixel, respectively, so as to produce colorful pictures. In other embodiments, the display unit DU can further include sub-pixels of other colors, and can include, for example, the green, red, blue and yellow sub-pixels, or the green, red, blue and white sub-pixels, but not limited herein. The display unit DU can include a first substrate SUB1, a light shielding layer LS and a first color layer CF1. In some embodiments, the display unit DU can further include a second substrate SUB2 disposed opposite to the first substrate SUB1 and other films and/or layers disposed on the surface S1 the first substrate SUB1 and the surface S2 of the second substrate SUB2, and can further include a display medium layer LC disposed between the first substrate SUB1 and the second substrate SUB2, but not limited thereto. When the display unit DU is a liquid-crystal display, the display medium layer can be a liquid-crystal layer, and the display unit can further include a backlight BLM (referring to FIG. 4) disposed on a side of the second substrate SUB2 opposite to the first substrate SUB1. The first substrate SUB1 and the second substrate SUB2 can be a transparent substrate, respectively. The transparent substrate can be a rigid substrate or a flexible substrate, and can be, for example, a glass substrate, a quartz substrate, a sapphire substrate, or a plastic substrate, but not limited thereto. The surface S1 of the first substrate SUB1 is the surface being closer to the second substrate SUB2 among the first substrate SUB1, and the surface S2 of the second substrate SUB2 is the surface being closer to the first substrate SUB1 among the second substrate SUB2.

Please continue to refer to FIG. 1. The light shielding layer LS is disposed on the surface S1 of the first substrate SUB1, and the light shielding layer LS has a plurality of first openings OP1 (only one is drawn for representation in FIG. 1). The light shielding layer LS is, for example, a black matrix layer or other material layer that can shield the light. The first color layer CF1 is disposed on the first substrate SUB1, the first color layer CF1 includes materials that can filter the color and/or convert the light color, and for example, can be a color filter layer, a light converting material layer including quantum dots, or includes both of the color filter layer and the quantum dots. The first color layer CF1 of this embodiment is a green light filtering layer for example, and can be used as a green color layer, but not limited thereto. According to this embodiment, the display unit DU can further include a second color layer CF2 and a third color layer CF3 disposed on the surface S1 of the first substrate SUB1, and the material thereof can refer to the first color layer CF1, wherein no details will be redundantly described herein. The second color layer CF2 and the third color layer CF3 are respectively a red light filtering layer and a blue light filtering layer for example, wherein the red light filtering layer and the blue light filtering layer are used as a red color layer and a blue color layer, but not limited thereto, and the colors of the second color layer CF2 and the third color layer CF3 can be exchanged for example. The first color layer CF1, the second color layer CF2 and the third color layer CF3 of this embodiment are respectively disposed in the first sub-pixel SPX1 the second sub-pixel SPX2 and the third sub-pixel SPX3, and the first sub-pixel SPX1 is a green sub-pixel. For displaying the pictures, each sub-pixel can respectively include a switch element ST, which can be disposed on the surface S2 of the second substrate SUB2 for example, and the switch element ST can control the corresponding sub-pixel to emit the light or not. The condition shown in FIG. 1 is enabling the first sub-pixel SPX1 to be in the on state and enabling the second sub-pixel SPX2 and the third sub-pixel SPX3 to be in the off state, the region of the first sub-pixel SPX1 may allow the light to transmit through, and the regions of the second sub-pixel SPX2 and the third sub-pixel SPX3 may not allow the light to transmit through. When the green sub-pixel in the electronic device 100 is in the on state, and the blue sub-pixel and the red sub-pixel in the electronic device 100 are in off state, this can be observed by the naked eyes or confirmed through the data sheet in the control circuit.

Furthermore, the electronic device 100 can include a plurality of sensing units SU (only one is symbolized for representation in FIG. 1, and the electronic device 100 may include a plurality of the structure shown in FIG. 1 appeared repeatedly). The sensing units SU are disposed on the surface S2 of the second substrate SUB2 and respectively located in one of the sub-pixels, that is, the sensing units SU can be disposed in the display unit DU (the display unit DU includes the sensing unit SU). The plurality of the sensing units SU of this embodiment are partially disposed in the first sub-pixel SPX1 but not disposed in the second sub-pixel SPX2 and the third sub-pixel SPX3, that is, the sensing units SU of this embodiment are disposed corresponding to the first sub-pixel SPX1, but the present disclosure is not limited by this embodiment. The first opening OP1 of the light shielding layer LS is disposed corresponding to one of the sensing units SU, that is, the first opening OP1 is located above the sensing unit SU. Furthermore, in the direction D1 perpendicular to the surface S1 of the first substrate SUB1, the first color layer CF1 of this embodiment is overlapped with the first openings OP1, that is, while viewing from the display side of the display unit DU (or in the top view direction perpendicular to the surface S1 of the first substrate SUB1), the first opening OP1 may expose the first color layer CF1. The disposal positions of the sensing unit SU and the first opening OP1 of the present disclosure are not limited to the above description, and other configuration may be introduced by the following embodiments.

Please refer to FIG. 3 and FIG. 4, together with FIG. 2, for the detailed structures of the display unit DU and the sensing unit SU. In FIG. 2, the films and layers on the surface S1 of the first substrate SUB1 are substantially shown, including the light shielding layer LS, the first color layer CF1, the second color layer CF2 and the third color layer CF3. In FIG. 3, partial films on the surface S2 of the second substrate SUB2 are substantially shown. The display unit DU includes a plurality of first conducting wires SL and a plurality of second conducting wires DL. The plurality of first conducting wires SL and the plurality of second conducting wires DL are respectively extending along the direction D2 and the direction D3 and the plurality of first conducting wires SL are intersected with the plurality of second conducting wires DL. In an embodiment, the plurality of first conducting wires SL and the plurality of second conducting wires DL are intersected to define a plurality of sub-pixels, i.e., the first sub-pixels SPX1, the second sub-pixels SPX2 and the third sub-pixel SPX3s mentioned above, and the first sub-pixels SPX1, the second sub-pixels SPX2 and the third sub-pixels SPX3 can be arranged side by side along the direction D2 by turns in sequence, but not limited thereto. The first conducting wires SL and the second conducting wires DL can be disposed on the surface S2 of the second substrate SUB2, wherein the first conducting wires SL can be formed by the first metal layer 114, and the second conducting wires DL can be formed by the second metal layer 112. The first conducting wires SL and the second conducting wires DL of this embodiment can be used as scan lines and data lines, respectively, to provide switch signals and data signals required to display pictures for each sub-pixel, but not limited thereto. In addition, when the first conducting wires SL and the second conducting wires DL may be not straight lines, the first conducting wires SL and the second conducting wires DL still can extend along the substantial extending direction respectively. Each sub-pixel may include a switch element ST and a pixel electrode PE1, or PE2, or PE3, and the switch element ST is electrically connected to the pixel electrode PE1, or PE2, or PE3. The switch element ST can be a thin-film transistor, wherein the gate of the thin-film transistor is electrically connected to the corresponding first conducting wire SL, the source of the thin-film transistor is electrically connected to the corresponding second conducting wire DL, and the drain is electrically connected to the pixel electrode in the same sub-pixel, but not limited thereto, and also the drain can be electrically connected to the corresponding second conducting wire DL, and the source is electrically connected to the pixel electrode PE1, or PE2, or PE3 in the same sub-pixel. The pixel electrodes of the first sub-pixel SPX1, the second sub-pixel SPX2 and the third sub-pixel SPX3 are respectively shown with the symbols of PE1, PE2 and PE3. The pixel electrodes PE1, or PE2, or PE3 occupy most of the areas in the first sub-pixel SPX1, the second sub-pixel SPX2 and the third sub-pixel SPX3, and the areas represent the display region of each sub-pixel. Although the contours of the pixel electrodes PE1, PE2, and PE3 are shown as rectangles in FIG. 3, the shape of the pixel electrodes PE1, PE2, and PE3 are not limited herein. The shape can be the parallelogram, the shape of "<" or other suitable shapes for example, and the pixel electrodes PE1, PE2, and PE3 can include one or a plurality of narrow openings. The pixel electrodes PE1, PE2, and PE3 can be formed by a transparent conductive layer including indium tin oxide (ITO), indium zinc oxide (IZO) or other suitable materials for example. On the other hand, please refer to FIG. 2, the light shielding layer LS on the surface S1 of the first substrate SUB1 further includes a plurality of display openings LS1, and the shapes and disposal positions thereof are generally corresponding to the contour of each pixel electrodes PE1, PE2, PE3, that is, the display openings LS1 are disposed in each sub-pixel and expose the corresponding pixel electrodes PE1, PE2, PE3, and simultaneously expose the color layer on the surface S1 of the first substrate SUB1. The opening area of the display opening LS1 also represents the display region of the above mentioned sub-pixel (or known as the opening region, and the ratio of the area thereof to the area of the sub-pixel is defined as the aspect ratio). As shown in FIG. 3, according to this embodiment, the U-shape formed by the semiconductor layer 118 of the switch element DT and the semiconductor layer 119 of the switch element ST can face different directions selectively, such that the area occupied by each elements can be further decreased, and the display quality of the electronic device 100 can be enhanced.

As shown in FIG. 4, the sensing unit SU is used to sense the fingerprint data, so as to enable the electronic device 100 to have the fingerprint recognition function. The sensing unit SU includes a photoelectric converting element PS and the switch element DT, and the photoelectric converting element PS and/or the switch element DT can be disposed on the surface S2 of the second substrate SUB2, but not limited thereto. The photoelectric converting element PS of this embodiment can include a first semiconductor layer PS1, a second semiconductor layer PS2 and a third semiconductor layer PS3. For example, the first semiconductor layer PS1 can be a P-type semiconductor layer, the second semiconductor layer PS2 can be an intrinsic layer, the third semiconductor layer PS3 can be a N-type semiconductor layer, and a PIN structure is formed by the first semiconductor layer PS1, the second semiconductor layer PS2, and the third semiconductor layer PS3. The photoelectric converting element PS can include amorphous silicon material layer for example, but not limited thereto. The upper side and the lower side of the PIN structure (the photoelectric converting element PS) can be respectively disposed with a first electrode 108 and a second electrode 110. The first electrode 108 is formed by a transparent conductive layer for example, the material can be referred to the pixel electrodes PE1, PE2, and PE3, and the second electrode can be formed by a third metal layer. As shown in FIG. 4, the first opening OP1 can be disposed above the photoelectric converting element PS. The switch element DT of this embodiment is a thin-film transistor for example, the thin-film transistor includes a source SE, a drain DE, a gate GE, a semiconductor layer 118 and a gate insulating layer 116, and the elements described above can be manufactured together with the switch element ST of the sub-pixel, the first conducting wire SL and the second conducting wire DL. The source SE (or the drain DE) of the switch element DT is electrically connected to the second electrode 110 of the photoelectric converting element PS of the same sub-pixel. Please refer to FIG. 3. According to the present disclosure, the electronic device 100 further includes a plurality of signal reading lines RL and a plurality of bias lines BL, and the plurality of signal reading lines RL and/or the plurality of bias lines BL extend along the direction D3, and the signal reading lines RL and the bias lines BL can be formed with a fourth metal layer 111. In the direction perpendicular to the surface S2 of the second substrate SUB2, one signal reading line RL and one bias line BL can be respectively overlapped with one second conducting wire DL. The first electrode 108 of the photoelectric converting element PS is electrically connected to the bias line BL through a conductive layer 106, and during the fingerprint recognition, the bias line BL can provide voltage to the photoelectric converting element PS. The drain DE of the switch element DT is electrically connected to the signal reading line RL. When the photoelectric converting element PS receives the light and converts the light energy into the electrical energy, the related signals can be transmitted to the signal reading line RL through the switch element DT, and then the signals representing the fingerprint data are outputted through the signal reading line RL, for example, to a data processing unit or a data recognition unit. Please refer to FIG. 4. The display unit DU can further include a buffer layer 120 and a light blocking layer 122 disposed on the surface S2 of the second substrate SUB2. The buffer layer 120 can provide the function of making the semiconductor layer 118 not to fall easily, and the light blocking layer 122 can provide the function of protecting the semiconductor layer 118. The display unit DU can further include a protecting layer 102 disposed on the surface S1 of the first substrate SUB1, providing the function of protecting the color layers.

Please refer to FIG. 1 and FIG. 2. According to this embodiment, the sensing unit SU is disposed in the first sub-pixel SPX1 but not disposed in the second sub-pixel SPX2 and the third sub-pixel SP3. Therefore, the ratio of the number of the sub-pixels in which the sensing units SU are disposed (which is the number of the first sub-pixels SPX1 in this embodiment) to the total number of all sub-pixels (the sum of the numbers of the first sub-pixel SPX1, the second sub-pixel SPX2 and the third sub-pixel SPX3) is less than 1, and the ratio described above of this embodiment is 1/3, but not limited thereto. In other embodiments, the ratio described above can also be greater than or equal to 1/3. In other words, in the electronic device 100 of the present disclosure, the sensing unit SU is not provided in all of the sub-pixels. For this embodiment, when the electronic device 100 is going to perform the fingerprint recognition, the user's finger FG may approach the display side of the display unit DU (the upper side in FIG. 1), and at this time the display unit DU of the electronic device 100 may make the visible light L1 with specific spectrum (or the visible light with a partial wavelength range) be emitted from the display unit DU. For example, the first sub-pixels SPX1 are in the on state, and the second sub-pixels SPX2 and the third sub-pixels SPX3 are in the off state, so the light produced by the backlight BLM may be emitted from the first sub-pixels SPX1. Alternatively, in another embodiment, the first sub-pixels SPX1 are in the on state, and only a minority of the second sub-pixels SPX2 and the third sub-pixels SPX3 are also in the on state, as long as the light of the minority of the second sub-pixels SPX2 and the third sub-pixels SPX3 may not affect the sensing result. For example, the ratio of the total number of the first sub-pixels SPX1 that are in the on state to the total number of the second sub-pixels SPX2 and the third sub-pixels SPX3 that are in the on state is greater than 1000.

In an embodiment, the first sub-pixel SPX1 is a green sub-pixel, and the wavelength of the highest wave peak of the visible light L1 that can transmit through the first color layer CF1 is between 492 nm to 577 nm, that is, in the spectrum thereof, the light intensity integral value in the wavelength range from 492 nm to 577 nm is greater than the light intensity integral value outside of the wavelength range from 492 nm to 577 nm, and the visible light L1 having the specific spectrum contour described above is known as green light and will be mentioned as green light in the following description. Since the fingerprint lines (the fingerprint ridge and the fingerprint valleys) on the surface of the finger FG may have different reflection effects on the light. Therefore, part of the visible light L1 may be reflected after traveling to the surface of the finger FG, and then transmit through the first opening OP1 of the light shielding layer LS and travel to the sensing unit SU of the first sub-pixel SPX1. After the photoelectric converting element PS in the sensing unit SU is illuminated by the visible light L1, the electronic signals can be outputted, and then the recognition unit forms the fingerprint information through the electronic signals. In the present disclosure, the wavelength range of the visible light is from 400 nm to 760 nm. The measurement method of the light intensity integral value described above is using the detector set outside the electronic device to detect the light emitted by the electronic device to obtain the light intensity integral value, wherein the shielding or absorption extent of the sensing element is less and can be negligible.

Please refer to FIG. 3. In another embodiment, the photoelectric converting element PS of the sensing unit SU is disposed in the first sub-pixel SPX1 (such as, but not limited to, a green sub-pixel) but not disposed in the second sub-pixel SPX2 and the third sub-pixel SP3, that is, the photoelectric converting element PS is disposed corresponding to the first sub-pixel SPX1. Therefore, the ratio of the total number of the photoelectric converting elements PS to the total number of the sub-pixels (the sum of the numbers of the first sub-pixel SPX1, the second sub-pixel SPX2 and the third sub-pixel SPX3) is less than 1, and the ratio described above of this embodiment is about 1/3, but not limited thereto. In other embodiments, the ratio described above can also be greater than or equal to 1/3. In other words, in the electronic device 100 of the present disclosure, the photoelectric converting element PS is not provided in all of the sub-pixels.

Figure 5:
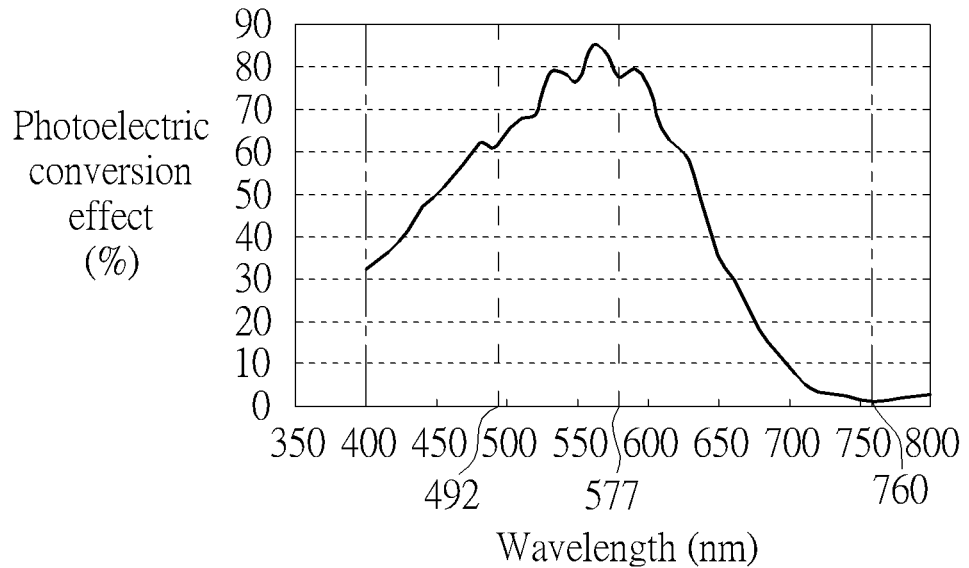
FIG. 5 is a photoelectric conversion effect graph of the amorphous silicon material.
Figure 6:
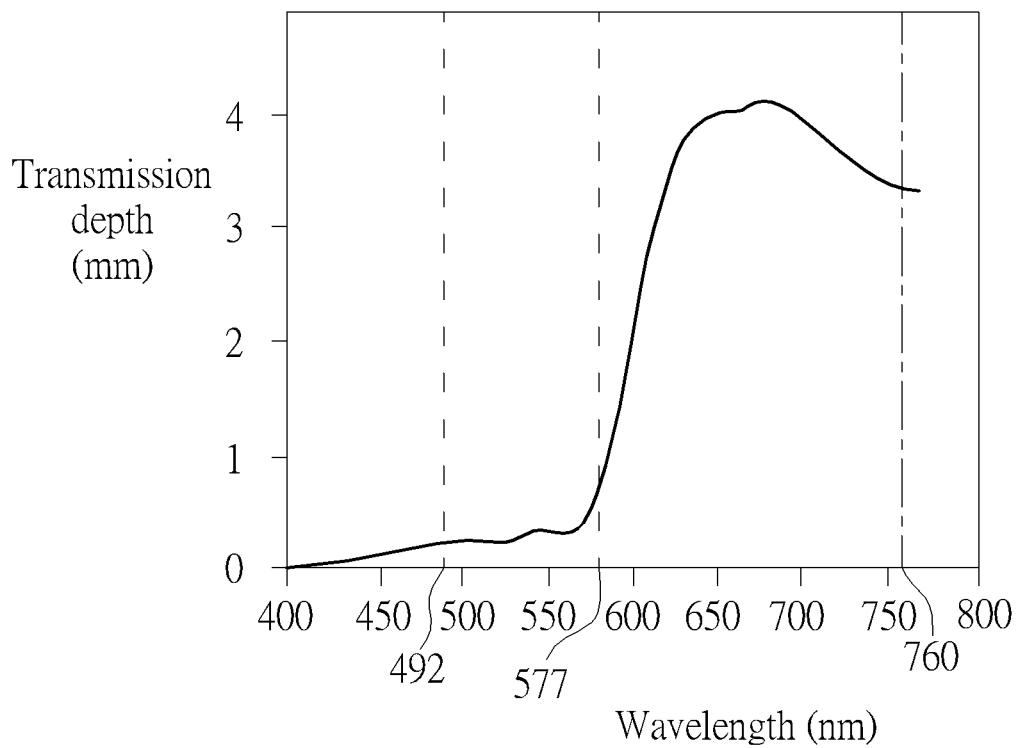
FIG. 6 is a schematic diagram of the transmission performance of different wavelengths to human skin.

Please refer to FIG. 5 and FIG. 6. FIG. 5 is a photoelectric conversion effect graph of the amorphous silicon material. According to FIG. 5, the amorphous silicon material has better photoelectric conversion efficiency in the green light waveband (492 nm to 577 nm). FIG. 6 is a schematic diagram of the transmission performance of different wavelengths to human skin. According to FIG. 6, the visible light with a wavelength below 600 nm has low transmission rate to human skin, so the visible light in the range of green light has low transmission rate to human skin, and similarly, human skin has better reflection effect on green light. According to the description above, this embodiment makes the display unit DU produce the visible light L1 of a green light waveband when performing the finger recognition, the finger FG may effectively reflect the visible light L1 of green light waveband, and the visible light L1 of the green light waveband can also enable the sensing unit SU to have better photoelectric conversion effectiveness, that is, having better sensing effect. On the other hand, referring to FIG. 1, the visible light L1 produced by the first sub-pixel SPX1 may be reflected by the finger FG, and travel to the corresponding sensing unit SU through the first opening OP1 in the same first sub-pixel SPX1. The angle of such emitted light and reflected light is small and the reflected light path is also short, the photoelectric conversion efficiency and/or sensing accuracy may be enhanced, and the probability of the incidence of stray light from other sub-pixels is reduced. Please refer to FIG. 2. According to this embodiment, the shortest distance SD1 between the first opening OP1 and the pixel electrode PE1 is in a range from 2 to 10 micrometers, but not limited thereto. Furthermore, since the display unit DU is enabled to produce green light when performing the fingerprint recognition, that is, the first sub-pixel SPX1 is turned on and the other sub-pixels are turned off, so only part of the light sources in the backlight BLM is turned on in some embodiments, and the electric power consumption or the waste of power can be saved. Besides, according to this embodiment, when the sensing unit SU in the first sub-pixel SPX1 is performing fingerprint recognition, since the visible light outside of the green light waveband of the light produced by the display unit DU is very weak, the problem of stray light interference can be reduced, in particular the stray light produced by the second sub-pixel SPX2 and the third sub-pixel SPX3 at the two sides of the first sub-pixel SPX1. Because of one or multiple advantages described above, the electronic device 100 and/or the fingerprint recognition method provided by this embodiment can provide better fingerprint recognition accuracy.

Please refer to FIG. 12. According to the present disclosure, when the user would like to enable the electronic device to perform fingerprint recognition so as to unlock the device, the user may first touch or approach a specific area of the display side of the electronic device 100 with a finger, and then the electronic device 100 of the present disclosure can perform fingerprint sensing for fingerprint recognition. The method of enabling the electronic device 100 to receive a fingerprint data includes following steps:

Step S500: Produce a visible light L1 by the display unit DU. In the spectrum of the visible light L1, the light intensity integral value in the wavelength range from 492 nm to 577 nm is greater than the light intensity integral value outside of the wavelength range from 492 nm to 577 nm, that is, the wavelength range of the visible light L1 mainly falls in the green light waveband. In other words, the visible light L1 can be also known as green light. In another condition, it can also make the green sub-pixel of the electronic device be in the on state, and make the blue sub-pixel and the red sub-pixel of the electronic device be in off state in Step S500;

Step S502: Use the sensing unit SU to sense a reflected portion of the visible light L1, and produce electric signals, which can include the fingerprint data; and Step S504: Receive the fingerprint data from the sensing unit SU. For example, the data processing unit, the data recognition unit or the control unit can receive the fingerprint data from the sensing unit SU.

The electronic device and the method for enabling the electronic device to receive the fingerprint data of the present disclosure are not limited to the embodiments described above. Other embodiments or variations of the present disclosed are disclosed in the following description. To simplify the description and emphasize the difference between each of the embodiments or the variations, the same symbols will be used to symbolize the same elements in the following description, and the repeated part will not be described redundantly. In addition, in the following embodiments of the present disclosure, the material and thickness of each film and the conditions of the process steps can be referred to the first embodiment, and thus will not be described redundantly.

Figure 7:
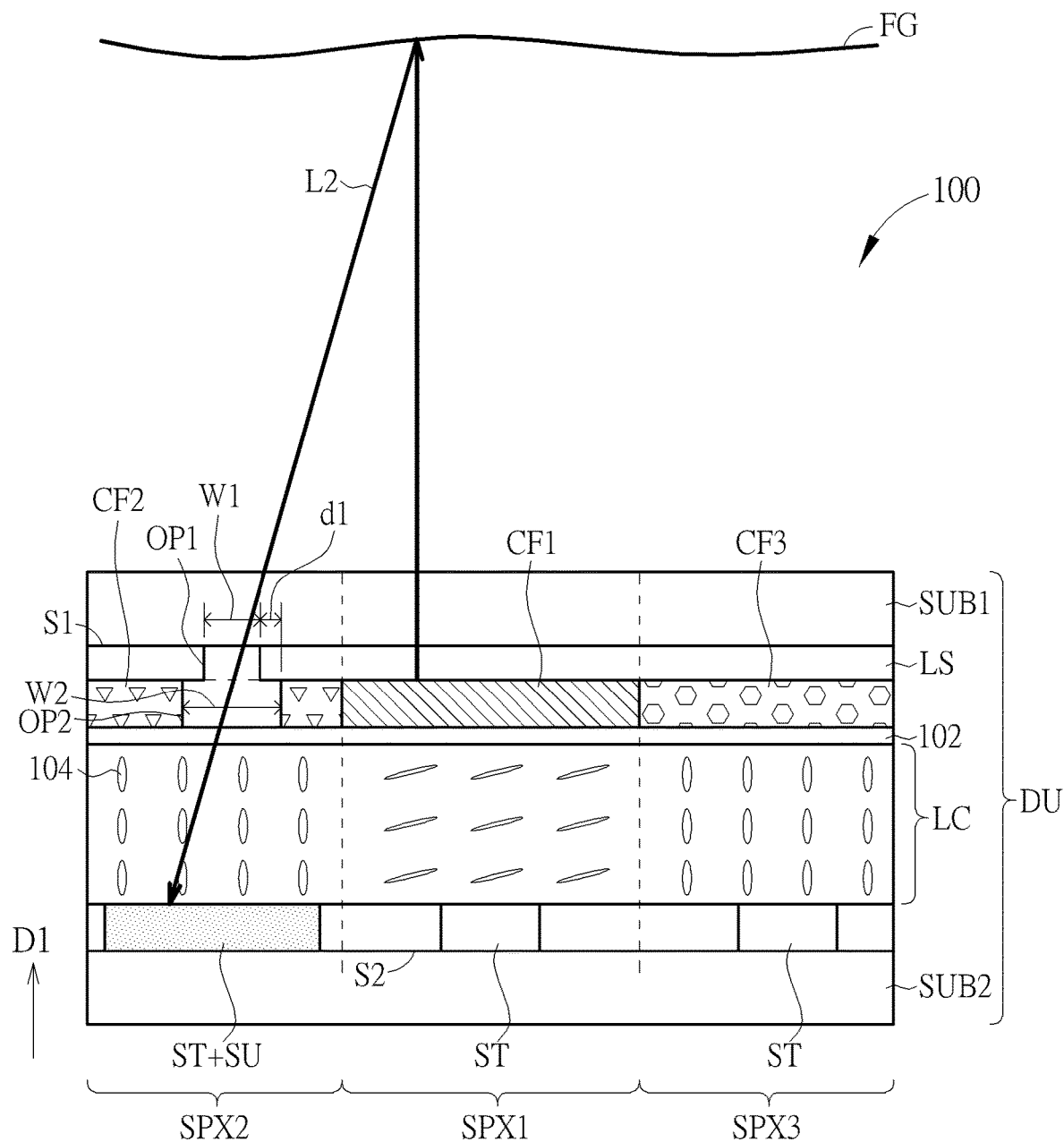
FIG. 7 is a schematic diagram of elements configuration according to a second embodiment of an electronic device of the present disclosure.
Figure 8:
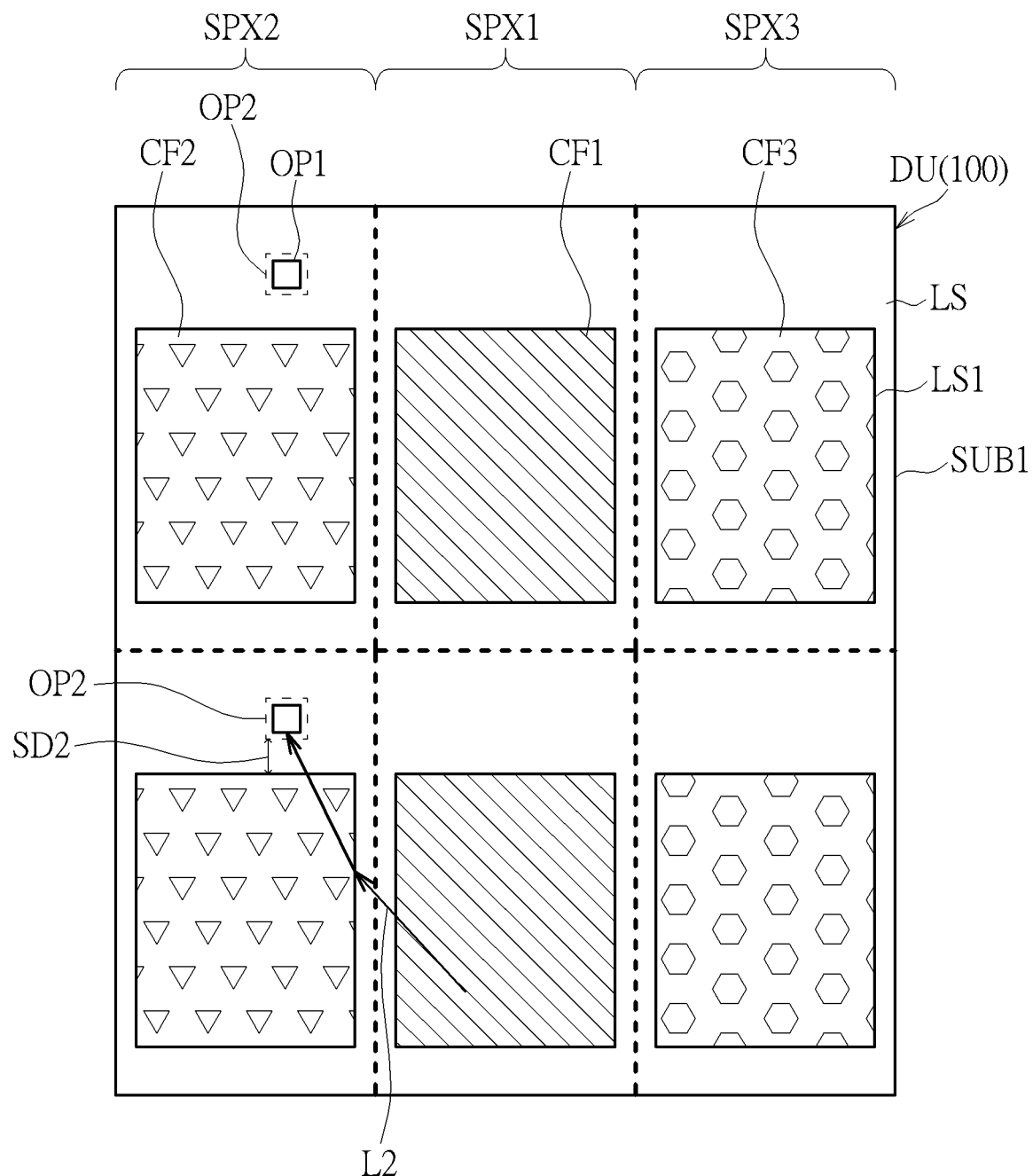
FIG. 8 is a top view schematic diagram of the light shielding layer and the color filter layer of the electronic device shown in FIG. 7.
Figure 9:
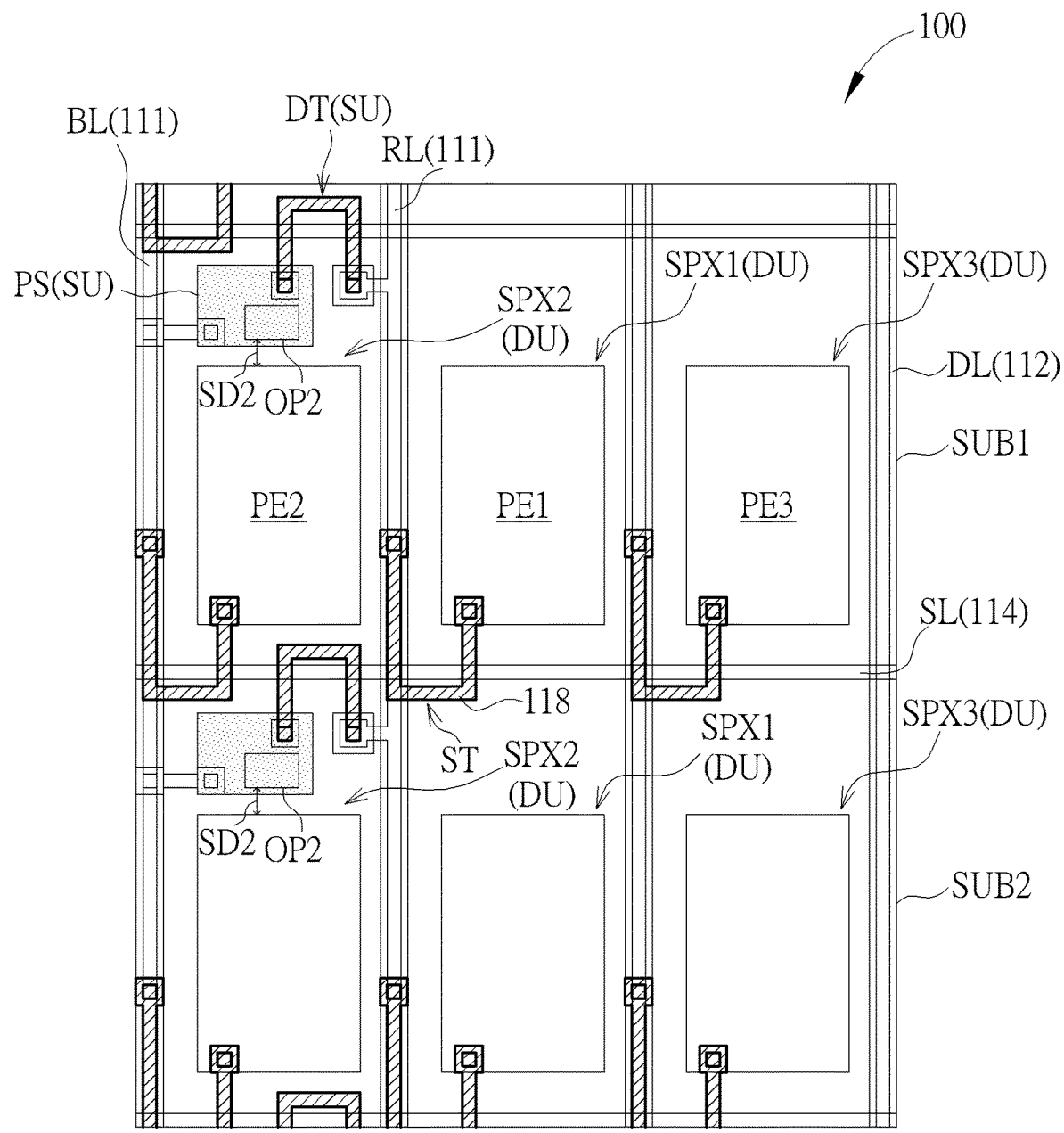
FIG. 9 is a detailed top view schematic diagram of the partial elements of the electronic device shown in FIG. 7.

Please refer to FIG. 7 to FIG. 9. FIG. 7 is a schematic diagram of elements configuration according to a second embodiment of an electronic device of the present disclosure. FIG. 7 is not a practical cross-sectional view diagram, wherein only partial elements are emphasized while other elements are omitted. FIG. 8 is a top view schematic diagram of the light shielding layer and the color filter layer (color layer) of the electronic device shown in FIG. 7. FIG. 9 is a detailed top view schematic diagram of the partial elements of the electronic device shown in FIG. 7. As shown in FIG. 7, the difference between this embodiment and the first embodiment is that the first opening OP1 of the light shielding layer LS is not partially disposed in the first sub-pixel SPX1 but partially disposed in another sub-pixel adjacent to the first sub-pixel SPX1, such as the second sub-pixel SPX2 or the third sub-pixel SPX3. In other words, the sensing unit SU and the first opening OP1 of the light shielding layer LS are partially disposed in the sub-pixel that is turned off during the fingerprint recognition (i.e., the pixel except for the green sub-pixel, such as the red sub-pixel or the blue sub-pixel). In other words, the sensing unit SU and the first opening OP1 are disposed corresponding to one of the red sub-pixel or the blue sub-pixel. As shown in FIG. 9, since the sensing units SU are partially disposed in the second sub-pixels SPX2, and the positions of the signal reading line RL and the bias line BL are changed accordingly. For example, the signal reading line RL is disposed between the second sub-pixel SPX2 and the first sub-pixel SPX1, and the bias line is disposed at another side of the second sub-pixel SPX2. As shown in FIG. 7, in this embodiment, the second color layer CF2 further includes a plurality of second openings OP2 (only one opening OP2 is shown in FIG. 7), and at least one of the plurality of first openings OP1 is overlapped with at least one of plurality of second openings OP2. In the present disclosure, the meaning of one element overlapped with another element means that when the two elements are projected to the first substrate or the second substrate in the direction D1 perpendicular to the substrate surface (S1, S2), the projections of the two elements may be at least partially overlapped. In other words, in the same second sub-pixel SPX2, the first opening OP1 of the light shielding layer LS may be overlapped with the second opening OP2 of the second color layer CF2. The area (or the size) of the first opening OP1 can be less than the area (or the size) of the second opening OP2. For example, the width W1 of the first opening OP1 in any direction parallel to the surface S1 of the first substrate SUB1 is less than the width W2 of the second opening OP2 in any direction parallel to the surface S1 of the first substrate SUB1. For example, the width W1 of the first opening OP1 can be in a range from 1 to 10 micrometers, and the distance difference d1 between the width W1 and the width W2 can be greater than 0 μm and less than or equal to 5 μm, but not limited thereto. This design of the second opening OP2 is greater, and this design of the second opening OP2 can reduce the problem of poor alignment of the first opening OP1 and the second opening OP2 due to the process tolerance, or can reduce the probability that the visible light L2 is absorbed by the second color layer CF2 after transmitting through the first opening OP1, so as to increase the total amount of visible light L2 traveling to the sensing unit SU. Similar to the previous embodiment, in the direction D1 perpendicular to the surface S1 of the first substrate SUB1, the first opening OP1 can be overlapped with the sensing unit SU, that is the first opening OP1 may be located above the photoelectric converting element PS. As shown in FIG. 7, the first opening OP1 in the second sub-pixel SPX2 may be located closer to the first sub-pixel SPX1, and the visible light L2 produced by the first sub-pixel SPX1 may travel to the first opening OP1 through a shorter path. The shortest distance SD2 between the second opening OP2 and the pixel electrode PE2 adjacent thereto of this embodiment is in a range from 2 μm to 10 μm, but not limited thereto. It is noted that, in the present disclosure, regarding the shortest distance between two elements that may be in different planes, it is defined as the shortest distance of the projections of the two elements on a same reference plane after the two elements are projected onto the same reference plane. In this embodiment, the sensing unit SU is partially disposed in one of the sub-pixels that is adjacent to the first sub-pixel SPX1, so the ratio of the number of the sub-pixels disposed with the sensing units SU (such as the second sub-pixel SPX2) to the total number of all sub-pixels (the sum of the numbers of the first sub-pixel SPX1, the second sub-pixel SPX2 and the third sub-pixel SPX3) is less than 1, and is equal to 1/3 or greater than 1/3 for example.

Figure 10:
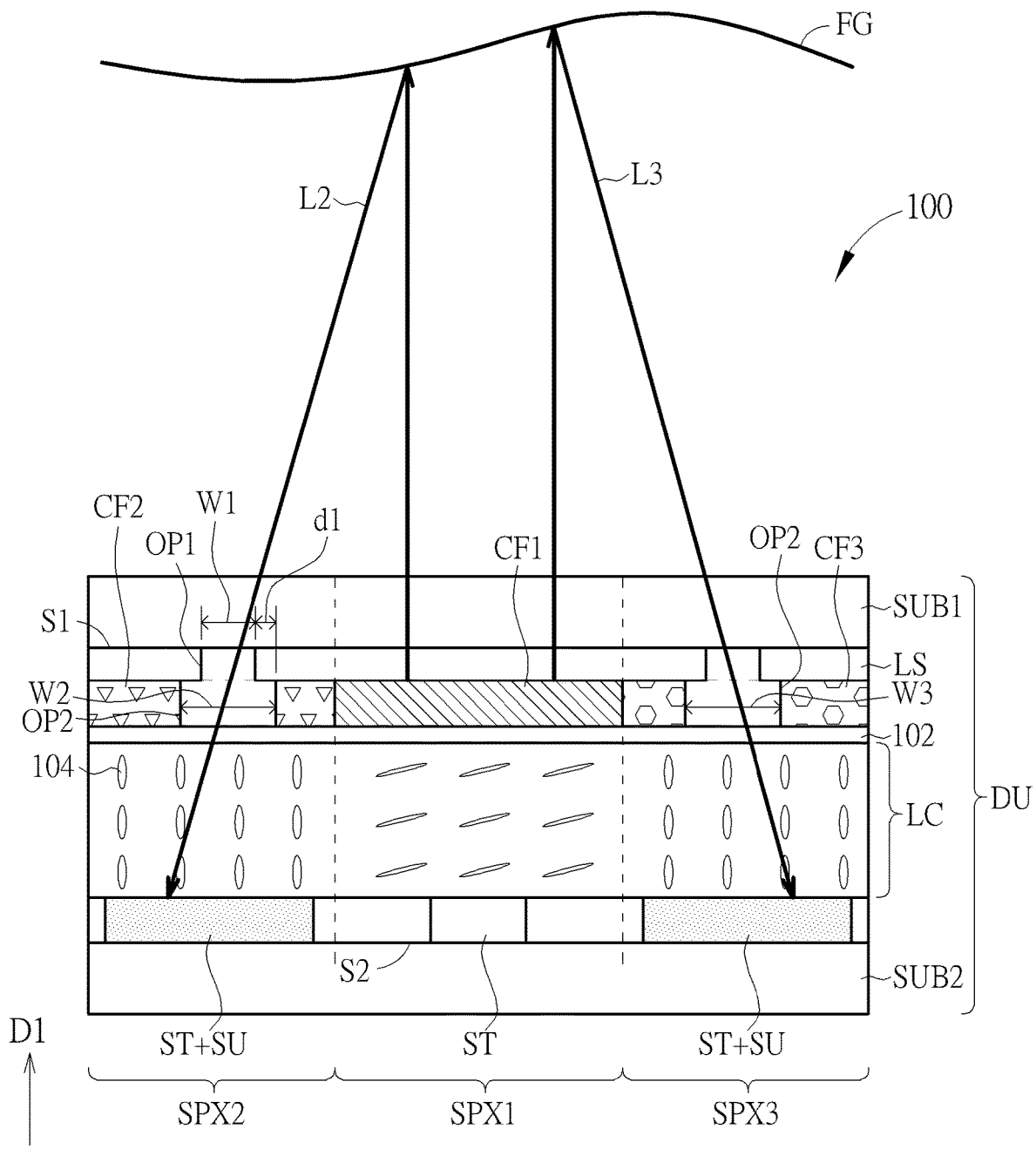
FIG. 10 is across-sectional view schematic diagram of elements configuration according to a third embodiment of an electronic device of the present disclosure.
Figure 11:
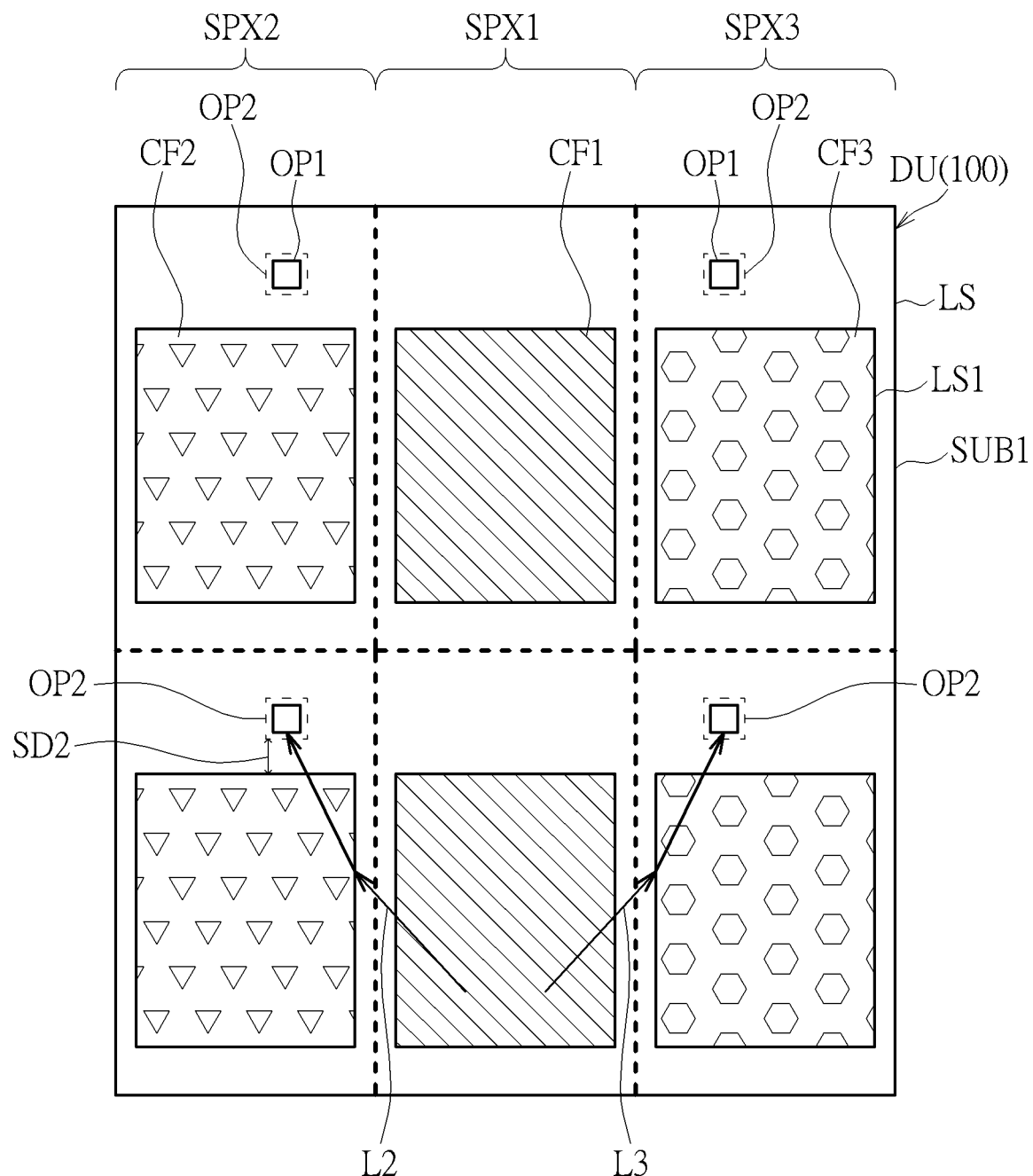
FIG. 11 is a top view schematic diagram of the light shielding layer and the color filter layer of the electronic device shown in FIG. 10.

Please refer to FIG. 10 to FIG. 11. FIG. 10 is a cross-sectional view schematic diagram of elements configuration according to a third embodiment of an electronic device of the present disclosure, and FIG. 11 is a top view schematic diagram of the light shielding layer and the color filter layer (color layer) of the electronic device shown in FIG. 10. As shown in FIG. 10, the difference between this embodiment and the second embodiment is that the sensing unit can be partially disposed in the two sub-pixels adjacent to the first sub-pixel SPX1, that is, both the second sub-pixel SPX2 and the third sub-pixel SPX3 are disposed with a part of the sensing units SU. Accordingly, the light shielding layer LS above the sensing units SU respectively includes the first openings OP1 partially disposed in the second sub-pixel SPX2 and the third sub-pixel SPX3, and the second color layer CF2 and the third color layer CF3 also respectively includes the second openings OP2, that is, a portion of the first openings OP1 and the second openings OP2 are disposed corresponding to the second sub-pixel SPX2 (such as blue sub-pixel), and another portion of the first openings OP1 and the second openings OP2 are disposed corresponding to the third sub-pixel SPX3 (such as red sub-pixel). Wherein, the size of the second openings OP2 of the third color layer CF3 is also greater than the size of the first opening OP1, and for example, the width W3 thereof in any direction is greater than the width W1 of the first opening OP1 in that direction. When performing the fingerprint recognition, the green visible light L2, L3 emitted by the first sub-pixel may be reflected by the finger FG into the second sub-pixel SPX2 and the third sub-pixel SPX3 at the both sides of and adjacent to the first sub-pixel SPX1, and after respectively transmitting through the first opening OP1 and the second opening OP2, the visible light L2, L3 may travel to the sensing units SU in the second sub-pixel SPX2 and the third sub-pixel SPX3, so as to produce photoelectric converting signals. According to this embodiment, as the number of the disposed sensing unit SU is greater, the resolution of the fingerprint recognition can be increased. Besides, the sensing units SU are partially disposed in the second sub-pixel SPX2 and the third sub-pixel SPX3 but not disposed in the first sub-pixel SPX1, so in the electronic device 100, the ratio of the number of the sub-pixels disposed with the sensing units SU (i.e., the second sub-pixel SPX2 and the third sub-pixel SPX3) to the total number of all sub-pixels (the sum of the numbers of the first sub-pixels SPX1, the second sub-pixels SPX2 and the third sub-pixels SPX3) is less than 1, and is equal to 2/3 for example, but not limited thereto. The ratio of the number of the sub-pixels disposed with the sensing unit SU to the number of the total sub-pixels of the present disclosure is in a range from 1/3 to 2/3, and can be changed according to the design needs. That is to say, the ratio of the total number of the photoelectric converting elements PS to the total number of the sub-pixels is in a range from 1/3 to 2/3. In addition, a portion of the photoelectric converting elements PS are disposed corresponding to the second sub-pixel SPX2 (such as the blue sub-pixel), and the other portion of the photoelectric converting elements PS are disposed corresponding to the third sub-pixel SPX3 (such as the red sub-pixel).

When the fingerprint recognition is performed by the electronic devices of the second embodiment and the third embodiment described above, the method of receiving the fingerprint data introduced in FIG. 12 can be applied, and will not be described redundantly.

From the above description, according to the present disclosure, the display unit is enabled to produce the green light when performing the fingerprint recognition, while only part of the sub-pixels are turned on or only part of the backlight is turned on, and the electric power consumption or the waste of power can be saved. In addition, the design of producing light by single kind of sub-pixels in the fingerprint recognition procedure and a part of the sub-pixels being disposed with sensing units can mitigate the stray light interference problem produced by adjacent sub-pixels, so as to make the light reflection path simple. Accordingly, it is not easily interfered by adjacent pixels when performing recognizing, and therefore the recognition accuracy and the recognition effect can be improved.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method for enabling an electronic device to receive a fingerprint data, the electronic device comprising a display unit, wherein the display unit comprises a green sub-pixel, a blue sub-pixel, a red sub-pixel and a sensing unit, and the method comprises following steps:

the green sub-pixel of the display unit being in an on state, the blue sub-pixel and the red sub-pixel of the display unit being in off state;
producing a visible light by the display unit;
using the sensing unit to sense a reflected portion of the visible light; and
receiving the fingerprint data from the sensing unit, wherein the display unit comprises:
a first substrate;

a light shielding layer disposed on a surface of the first substrate, the light shielding layer having a plurality of first openings; and a first color layer disposed on the surface of the first substrate, wherein in a direction perpendicular to the surface of the first substrate, the plurality of first openings are overlapped with the first color layer.

2. The method according to claim 1, wherein the first color layer is a green color layer.

3. The method according to claim 1, wherein the display unit comprises a plurality of sensing units, and at least one of the plurality of first openings is disposed corresponding to one of the plurality of sensing units.

4. The method according to claim 1, wherein the display unit comprises a second substrate and a plurality of pixel electrodes disposed on the second substrate, wherein a shortest distance between one of the plurality of first openings and one of the plurality of pixel electrodes is in a range from 2 to 10 micrometers.

5. The method according to claim 1, wherein the sensing unit comprises a photoelectric converting element, and the photoelectric converting element comprises amorphous silicon material.

6. The method according to claim 1, wherein in a spectrum of the visible light, a light intensity integral value in a wavelength range from 492 nm to 577 nm is greater than a light intensity integral value outside of the wavelength range from 492 nm to 577 nm.

7. A method for enabling an electronic device to receive a fingerprint data, the electronic device comprising a display unit, wherein the display unit comprises a green sub-pixel, a blue sub-pixel, a red sub-pixel and a sensing unit, and the method comprises following steps:

the green sub-pixel of the display unit being in an on state, the blue sub-pixel and the red sub-pixel of the display unit being in off state;

producing a visible light by the display unit;

using the sensing unit to sense a reflected portion of the visible light; and receiving the fingerprint data from the sensing unit, wherein the display unit comprises:

a first substrate;

a light shielding layer disposed on a surface of the first substrate, the light shielding layer having a plurality of first openings; and a second color layer disposed on the surface of the first substrate and having a plurality of second openings, wherein in a direction perpendicular to the surface of the first substrate, at least one of the plurality of first openings is overlapped with at least one of the plurality of second openings.

8. The method according to claim 7, wherein an area of the at least one of the plurality of second openings is greater than or equal to an area of the at least one of the plurality of first openings.

9. The method according to claim 7, wherein in a direction parallel to the surface of the first substrate, a width of the at least one of the plurality of first openings is less than a width of the at least one of the plurality of second openings.

10. The method according to claim 7, wherein the second color layer is a blue color layer or a red color layer.

11. The method according to claim 7, wherein the display unit comprises a plurality of blue sub-pixels and a plurality of red sub-pixels, and the plurality of first openings and the plurality of second openings are disposed corresponding to the plurality of blue sub-pixels or the plurality of red sub-pixels.

12. The method according to claim 7, wherein the display unit comprises a plurality of blue sub-pixels and a plurality of red sub-pixels, a portion of the plurality of first openings and the plurality of second openings are disposed corresponding to the plurality of blue sub-pixels, and another portion of the plurality of first openings and the plurality of second openings are disposed corresponding to the plurality of red sub-pixels.

13. The method according to claim 7, wherein the display unit comprises a second substrate and a plurality of pixel electrodes disposed on the second substrate, wherein a shortest distance between the at least one of the plurality of second openings and at least one pixel electrode of the plurality of pixel electrodes is in a range from 2 to 10 micrometers.

* * * * *